Figure 1:
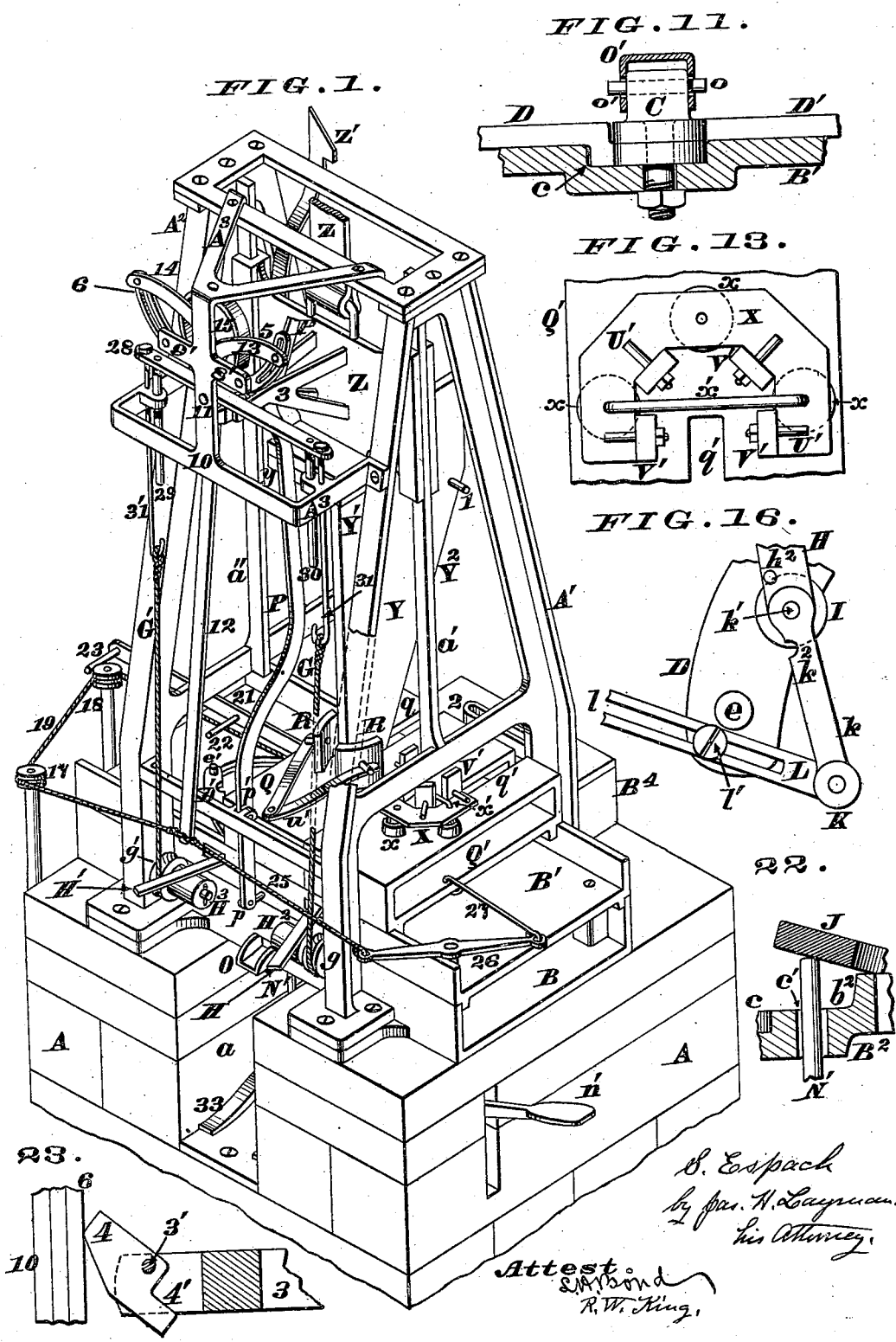

S. ESPACH.
MACHINES FOR MAKING HORSESHOES.
No. 183,451. Patented Oct. 17, 1876.

5 Sheets—Sheet 1.

S. ESPACH.
MACHINES FOR MAKING HORSESHOES.

No. 183,451. Patented Oct. 17, 1876.

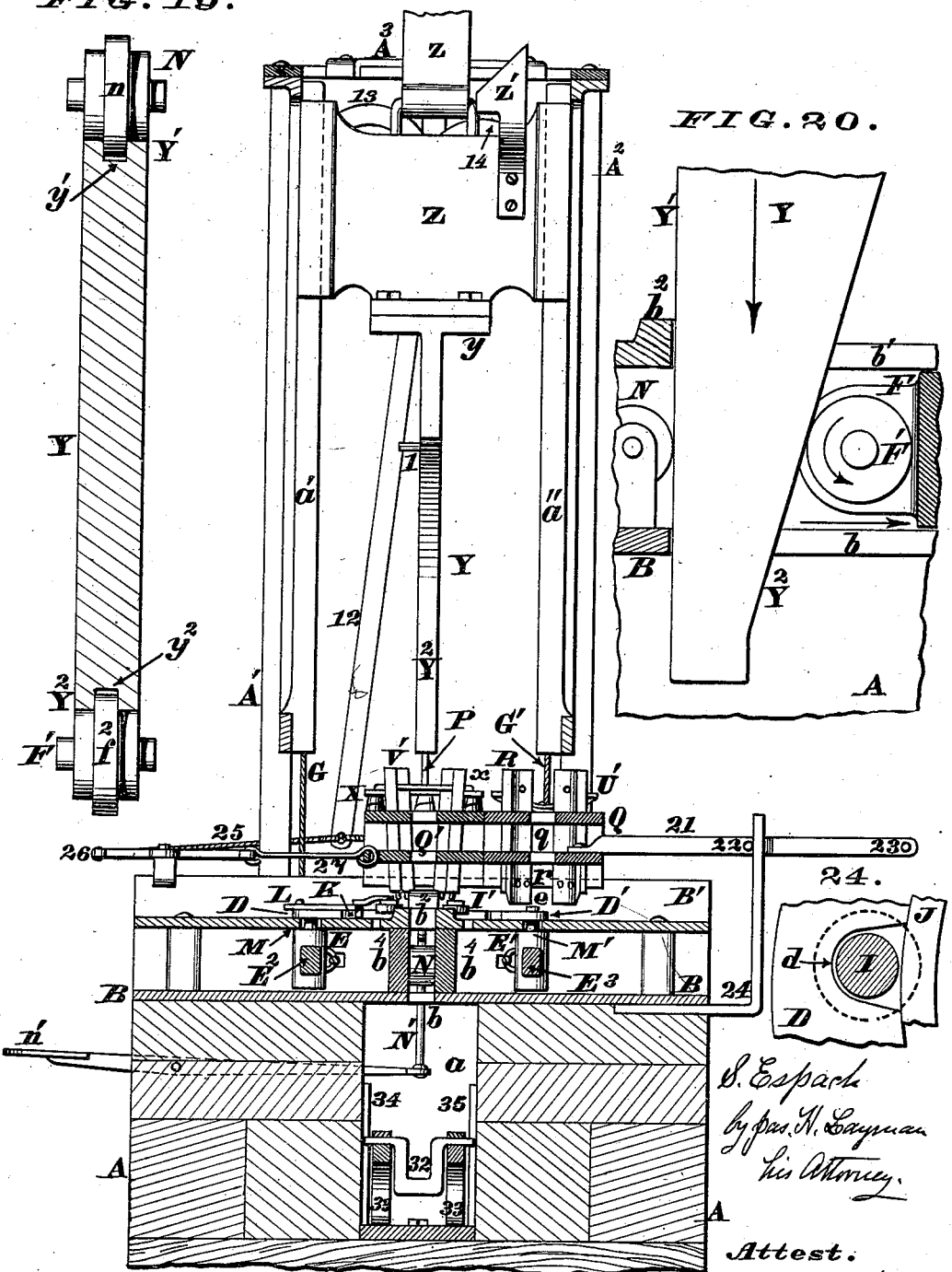

5 Sheets—Sheet 5.
S. ESPACH.
MACHINES FOR MAKING HORSESHOES.
No. 183,451. Patented Oct. 17, 1876.
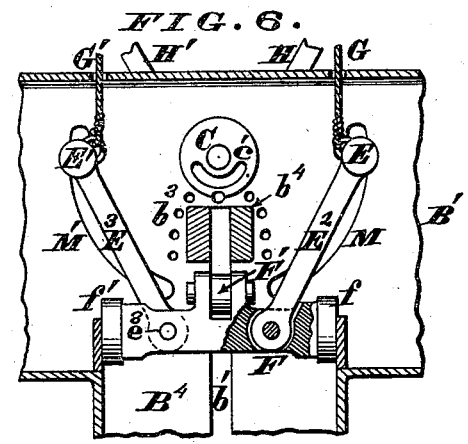
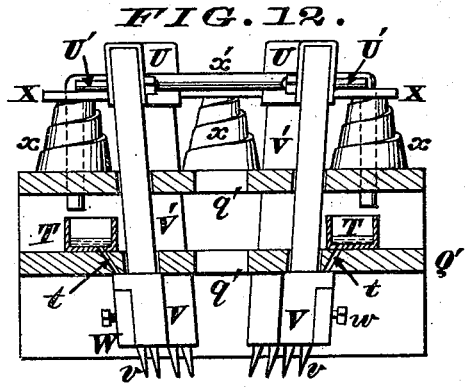
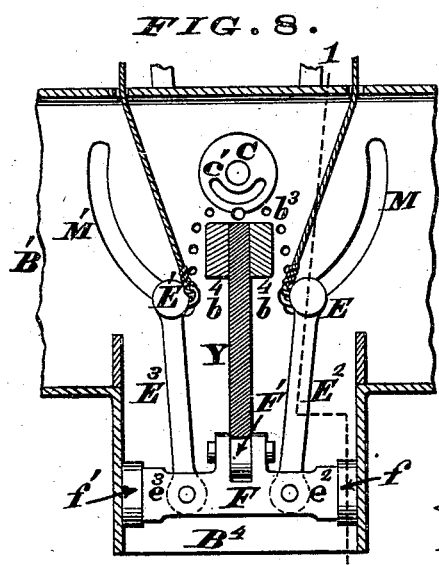
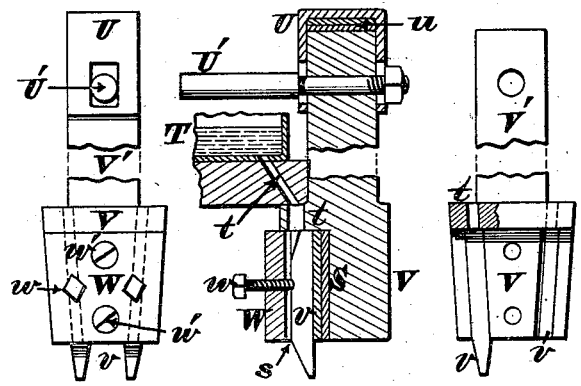
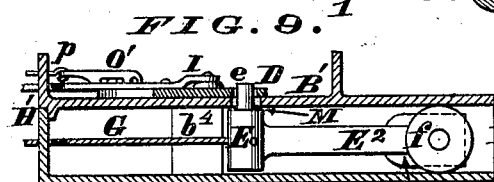
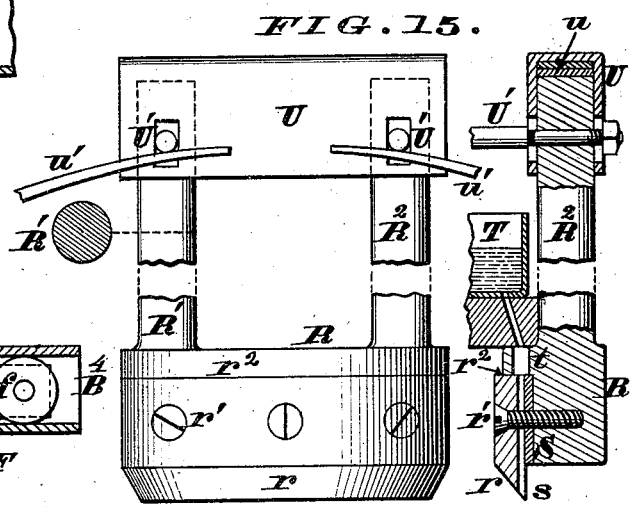
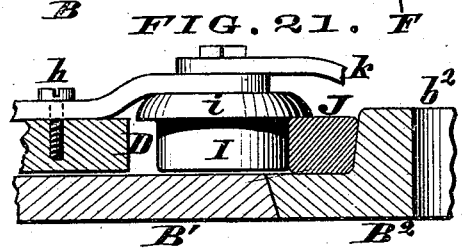
S. Espach
by Jas. H. Layman,
his Attorney.
Attest.
C. A. Bond
R. W. King.

UNITED STATES PATENT OFFICE

SERAPHIN ESPACH, OF CINCINNATI, OHIO, ASSIGNOR OF ONE-HALF HIS RIGHT TO JOHN R. R. LINDNER, OF SAME PLACE.

IMPROVEMENT IN MACHINES FOR MAKING HORSESHOES.

Specification forming part of Letters Patent No. 183,451, dated October 17, 1876; application filed August 21, 1876.

*To all whom it may concern:*

Be it known that I, SERAPHIN ESPACH, of Cincinnati, Hamilton county, Ohio, have invented certain new and useful Improvements in Horseshoe-Machines, of which the following is a specification:

This invention relates to that class of machines in which a heated bar or blank of the proper length is bent around a fixed horizontal die or former; and the principal feature of my improvements consists in a novel combination of mechanical appliances for bending the blank. Of these appliances, the two that act directly upon the blank are a pair of jaws pivoted to the same bed-plate that supports the die, and capable of being opened and closed in a horizontal plane, which closure bends the heated bar around the die, while the opening of said jaws allows the shoe being liberated and removed from the machine by hand.

In order to exert sufficient force upon the jaws, so as to insure the perfect bending of the blank, said jaws are closed at suitable intervals of time by the descent of a heavy plunger, or hammer, or drop-weight, which reciprocates vertically within the main frame of the machine. The front edge of this vertically-acting plunger is inclined so as to act as a wedge against a roller, which latter is journaled in a carriage situated beneath the bed-plate that supports the die or former, said carriage being capable of a movement transversely of the machine. The descent of said plunger drives this concealed carriage toward the front side of the machine, and in so doing the bending-jaws are closed by means of a pair of connecting-rods that couple said jaws and carriage together. As the aforesaid plunger weighs about six hundred pounds and falls nearly five feet, it is evident that the momentum of such a drop co-acting with its wedge-shaped edge must exert an enormous force upon the jaws, and cause them to bend the heaviest blank instantaneously and with the utmost precision. The very moment the blank is bent and creased an elastic stirrup receives the impact of the descending plunger and initiates its return stroke, the complete elevation of said plunger serving to retract the carriage and thereby open the bending-jaws. Two such descending strokes of the plunger are necessary to complete a single shoe, the first stroke serving to bend and immediately crease the blank, while the second blow punches the nail-holes through the creased portion. The bent, creased, and punched blank is then disengaged from the die by means of a push-pin, operated with a treadle convenient to the attendant, who removes the shoe from the machine with a pair of tongs. In order that the stationary blank may be first creased and then punched, the proper creasing and punching dies are mounted within separate, but connected, boxes, which latter are automatically reciprocated longitudinally of the bed-plate. This reciprocating movement of the coupled boxes brings the creasers and punches alternately in a proper position to receive the impact of a flange projecting from the plunger.

In addition to the above, or the leading feature of the invention, I have devised other improvements in the machine, of which improvements the details of construction and operation will be hereinafter explained.

Figure 2:
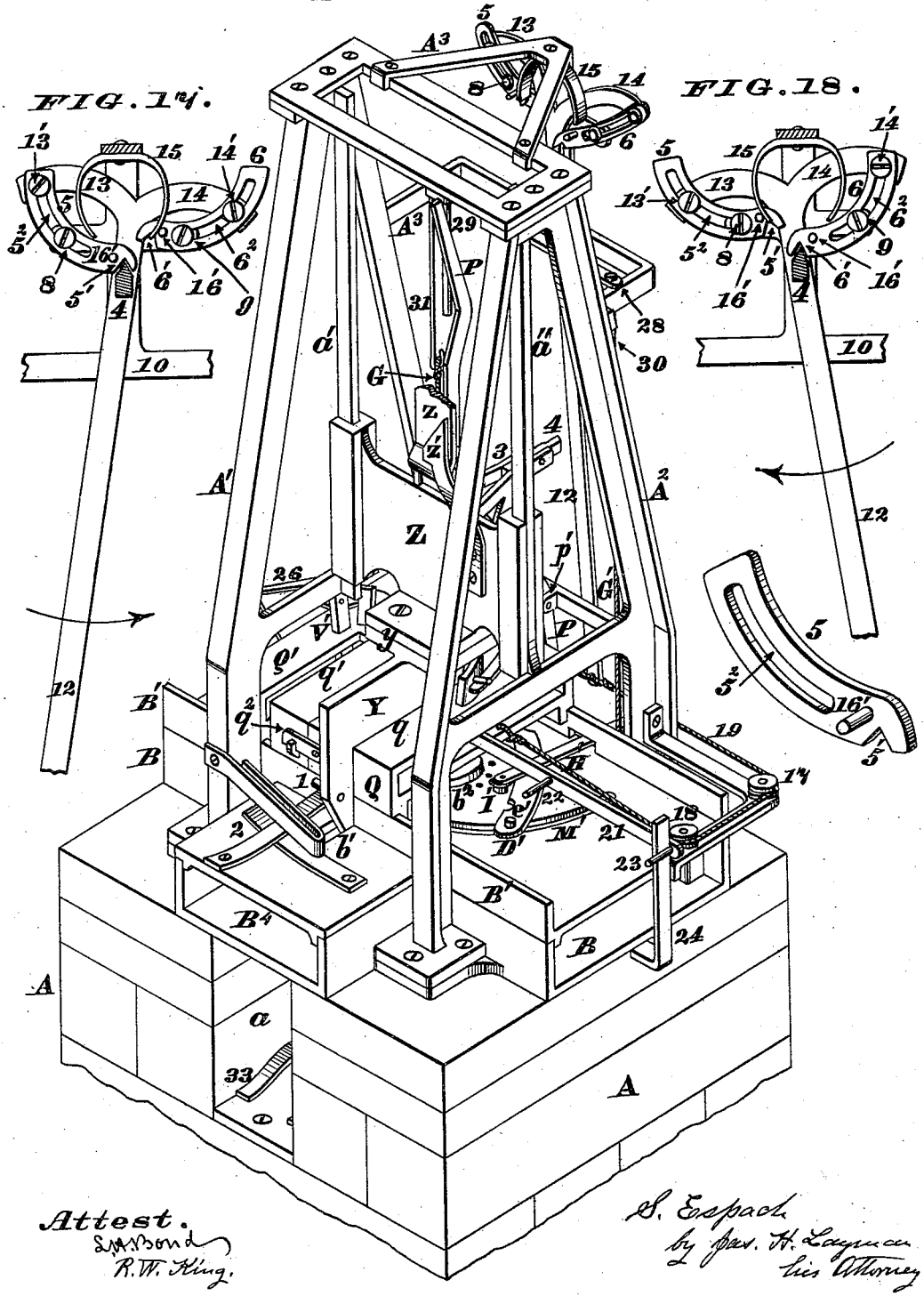
Figures 3, 4, 5, 10:
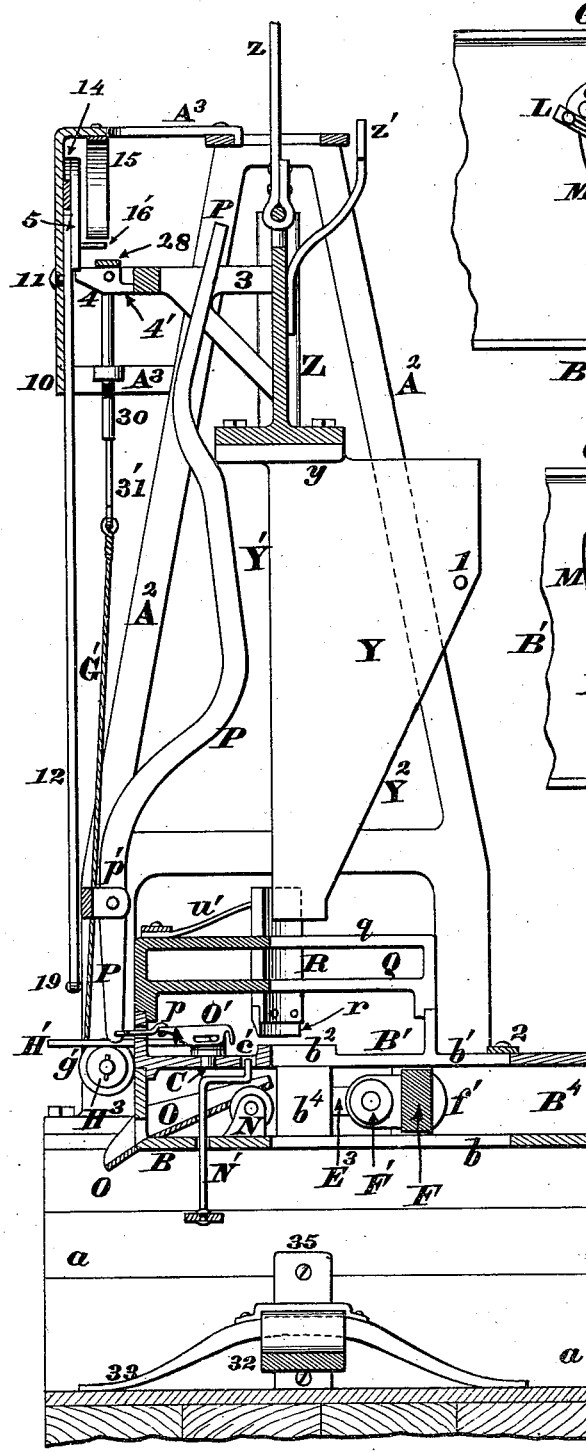

In the annexed drawings constituting part of this specification, Figure 1 is a perspective view, showing the rear side and the delivery end of my machine, the plunger being represented as in the act of ascending from the creasing-box. Fig. 2 is a perspective view, showing the front side and the receiving end of the machine, the plunger being represented as about to strike upon the creasers. Fig. 3 is a vertical section in the plane of the plunger, the operative parts being shown in the same position as represented in Fig. 1. Fig. 4 is a vertical section taken longitudinally of the bed-plate, the plunger being represented completely elevated and about to descend into the punching-box. Fig. 5 is a plan, showing the distended position the bending-jaws assume when the plunger is elevated. Fig. 6 is a plan of the carriage and connections that operate said jaws, the latter being presumed to be in the same position as shown in Fig. 5. Fig. 7 is a plan, showing the bending-jaws closed by the descended plunger. Fig. 8 is a plan of the carriage and its accessories, the bending-jaws being presumed to be in the same position as shown in the preceding illustration. Fig. 9 is a transverse section of the bed-plate at the line 1 1. Fig. 10 is a vertical section through the hinged joint of the jaws, the section being taken in the plane of the shiftable vibrating claw or clamp, which latter is shown in contact with the blank. Fig. 11 is another section of said hinge-joint, but taken transversely of the claw. Fig. 12 is a vertical section through the punching-box. Fig. 13 is a plan of the same. Fig. 14 represents, by section and elevation, one of the punches detached from its appropriate box. Fig. 15 represents, by section and elevation, the preferred construction of one of the creasing-dies. Fig. 16 is a plan of the gage or stop that limits the entrance into the machine of the heated blank, said gage being shown in the same position as seen in Fig. 7, but drawn on an enlarged scale. Figs. 17 and 18 represent the two opposite positions of the swinging lever that reciprocates the creasing and punching boxes longitudinally of the bed-plate. Fig. 19 is an enlarged horizontal section, showing the grooved plunger engaged with the two flanged guide-rollers. Fig. 20 is a section illustrating the action of the descending plunger on the carriage that operates the bending-jaws. Fig. 21 is a vertical section of one of the flanged pressure-rollers that maintain the blank in contact with the bed-plate.

Diagrams 22, 23, and 24 will be explained hereafter.

A A represent two timber foundations, separated by an interval, $a$, thereby affording space for the elastically-supported stirrup or cushion that receives the impact of the descending plunger. Firmly attached to these wooden piers are two heavy parallel bed-plates, B $B^1$, which may be rigidly secured to each other by bolts, or otherwise. The upper bed-plate $B^1$ has fitted within it the removable die-block $B^2$, whose raised portion $b^2$ constitutes the die or former around which the heated blank is bent. The block $B^2$ can be readily removed and another one, with a different-sized die, can be fitted in the bed-plate $B^1$ in a few minutes. Each die-block is furnished with a series of perforations, $b^3$, to allow the punchings from the shoe to escape. Located beneath the die-block $B^2$ are braces $b^4$, that rest upon the lower bed-plate B, by which arrangement said plate assists in sustaining the die. The bed-plates B and $B^1$ are furnished with a lateral extension, $B^4$, to afford sufficient travel transversely of the machine of the carriage that operates the bending-jaws. Furthermore, these bed-plates are respectively slotted at $b$ $b^1$, which transverse openings are wide enough to allow the free passage through them of the operating plunger. Located in line with slot $b^1$, and situated near the rear side of the bed-plate $B^1$, is the pivot C of bending-jaws D D', which latter are stout plates, having their inner edges curved so as to approximate, when closed, the shape of die $b^2$, as seen in Fig. 7. In order that these bending-jaws may fit snugly upon bed-plate $B^1$, the hinged portion of jaw D is seated in a pit, $c$, of said plate, as more clearly shown in Figs. 10 and 11. Arranged concentrically with pivot C is a slot, $c^1$, that allows scales from the blank to fall through, and, if preferred, the scales may be forced through said slot, either with an air-blast or else with a stream of water.

The bending-jaws D D' are opened and closed by the following devices: The free ends of these jaws have engaged with them studs $e$ $e^1$, projecting vertically from the upper ends of movable stumps E $E^1$, which latter are situated between the parallel bed-plates B $B^1$, as seen in Figs. 3 and 4. These stumps have secured to them respectively the rear ends of connecting-rods $E^2$ $E^3$, whose front ends are pivoted at $e^2$ $e^3$ to a carriage, F, mounted upon wheels $f$ $f^1$, and adapted to travel back and forth within the lateral extension $B^4$, as represented in Figs. 6, 8, and 9. The rear side of this carriage has journaled in it a guide-roller, $F^1$, which is preferably provided with an annular rib or flange, $f^2$, as seen in Fig. 19. Attached to the stumps E $E^1$ are chains or wire-ropes G $G^1$, which are passed through suitable slots in the rear side of the machine and then carried around sheaves $g$ $g'$, after which said chains are secured to lifting-rods, that will presently be described. Hinged to the bending-jaws D D' at $h$ $h^1$ are levers H $H^1$, whose inner ends have journaled in them pressure-rollers I I', flanged on their upper ends at $i$, so as to maintain the blank J snugly in contact with the horizontal surface of die-block $B^2$. (See Fig. 21.) When the bending-jaws are in their distended position, as represented in Figs. 1 and 5, these pressure-rollers I I' are in close proximity to pivot C; but while said jaws are closing these rollers sweep around the blank, and finally reach the position shown in Fig. 7. During this movement of levers H $H^1$ their rollers exert only a downward pressure upon the blank, while the unflanged portions of said rollers enter notches or coves $d$ $d'$ of jaws D D', and thereby relieve said rollers of any strain incidental to the bending of the blank around the die. (See Diagram 24.)

The rear ends of levers H $H^1$ pass through slots in the side of the machine, and are, respectively, supported upon cylinders $H^2$ $H^3$, the latter being journaled upon the same stud-shafts that carry the sheaves $g$ $g'$, previously alluded to. These cylinders maintain the flanges $i$ of pressure-rollers I I' in contact with the upper surface of the blank, while at the same time the levers H $H^1$ are free to vibrate upon their respective pivots $h$ $h^1$.

In order to arrest the entering blank at the proper place, I provide a stop or gage, K, at the free end of a link, $k$, pivoted to lever H at $k^1$. Coupled to this stop K is a shackle, L, whose longitudinal slot $l$ receives a guide-screw, $l'$, that is tapped in the free end of jaw D, and near stud $e$. Link $k$ is notched at $k^2$ to bear against a pin, $h^2$, projecting vertically from lever H. This pin serves as a stop to arrest the link, and thus maintain gage K in a proper position when the bending-jaws are open. (See Figs. 4, 5, and 16.) The bed-plate $B^1$ is furnished with slots M M' concentric with pivot C, and traversed by the studs $e$ $e^1$, that operate the bending-jaws D D'. N is a stationary roller, located between the bed-plates B $B^1$, and serving as a guide for the rear or vertical edge of the plunger. This roller may be provided with an annular rib or flange, $n$, as seen in Fig. 19. N' is a push-pin capable of being forced up through an aperture in bed-plate $B^1$, to disengage the finished shoe from the die, as indicated in Diagram 22. This push-pin is operated by a treadle, $n'$, projecting at the delivery end of the machine. O is a chute or trough that conducts the punchings, scales, &c., away from the machine.

Secured in the head of pivot C is a pin, $o$, disposed longitudinally of the bed-plates B $B^1$, and serving as a bearing for a transversely-shiftable and vertically-vibrating clamp or claw, O', slotted at $o'$, to admit the bearing-pin. This claw is operated at the proper time by a rod, $p$, attached to the lower end of lever P, the latter being pivoted at $p'$ to one of the cross-bars of the main frame.

Adapted to ride upon the vertical flanges of bed-plate $B^1$ are two distinct but united boxes, Q Q', of which the former is the creasing-box, and the latter the punching-box. These boxes are, respectively, slotted transversely at $q$ $q^1$, and are coupled together with latches or hooks $q^2$, or otherwise.

The creasing-dies $r$ of box Q may be applied to the lower ends of curved plates R, as represented in Figs. 1, 2, 3, and 4, but the preferred construction of these devices is shown in Fig. 15. Reference to this last illustration will show that the curved creasing-die $r$ is secured to a head, R, with bolts or screws $r^1$. These bolts simply serve to unite said die to the head, the upward stress of the creaser $r$ being received upon the ledge or shoulder $r^2$.

The rear or concaved side of creaser $r$ is provided with one or more grooves, $s$, to conduct oil down to the edge of said die, the lubricant being contained in a reservoir, T. $t$ are channels that lead the oil from the reservoir into grooves $s$.

In order to adjust the creasers so as to be equally effective for various sized shoes, one or more fillings, S, of any suitable material, are interposed behind the dies $r$.

Projecting vertically from head R are two or more cylindrical shafts or stems, $R^1$ $R^2$, whose upper ends are housed within a common cap, U, washers or fillings $u$ being inserted between said stems and the cap. This cap U receives the direct blow of the falling plunger, and the interposed fillings enable said cap being set so as to transmit an uniform pressure to the creasing-die $r$. Outwardly-projecting pins U' sustain the upward stress of springs $w'$, which retract die $r$ the moment the crease has been made and the cap relieved from the weight of the plunger. The punches $v$ of box Q' are fitted in sockets $v'$ of a head, V, whose shank V' is provided with a cap, U, a series of washers, $u$, and a pin, U', which devices are essentially the same as those applied to the creasers. These details of the punches are more clearly shown in Fig. 14. The punches are retained in position by set-screws $w$ tapped into a cap, W, said cap being secured to the head V with bolts $w'$. Furthermore, the punches are furnished with fillings S, oil-grooves $s$, reservoirs T, and channels $t$, substantially the same as those employed with the creasers, with the slight exception that in the present case the channels $s$ are cut in the rear side of retaining-cap W. The duty of these grooves $s$, reservoirs T, and channels $t$ is the same in both cases—that is to say, they insure an intermittent discharge of lubricant from the vessels T to the creasers or punches by reason of the vertically-reciprocating movement of the latter devices. When the creasers and punches are elevated their respective grooves $s$ communicate with the lower ends of the appropriate channels $t$, and, consequently, the grooves are charged with a proper quantity of oil, which lubricant escapes from said grooves as soon as the creasers and punches are brought in contact with the blank. On account of this intermittent discharge all waste of oil is prevented, as the lubricant is used only at the moment of contact of the creasers and punches with the blank. The devices $v$ V V' are not vertical, but are inclined so as to underpunch the shoe at any suitable angle, as represented in Figs. 4 and 12.

As many of these creasers may be used as will be found the most effective, but, in order that all of them may be simultaneously elevated and depressed, their outwardly-projecting pins U' are supported upon a flat plate or yoke, X, which acts as a binder for the upper ends of said punches. This yoke is seated upon a number of spiral springs, $x$, of which the two opposing ones are coupled together by a rod, $x'$, whose down-turned ends occupy axial positions within said opposing springs. (See Figs. 12 and 13.) These coiled springs act precisely like the devices $w'$ that support the creasers R $r$.

The plunger or drop or hammer previously alluded to consists of a flat plate, Y, of cast-iron, having a vertical rear edge, $Y^1$, and an inclined front edge, $Y^2$, said edges being, respectively, grooved at $y^1$ and $y^2$, to admit the flanges $n$ and $f^2$ of the guide-rollers N and F', as represented on an enlarged scale in Fig. 19. This wedge-shaped plunger has at top a flange, $y$, securely bolted to a cross-head, Z, that is adapted to reciprocate vertically along the guides $a'$ $a''$ of the main frame A' A''. Attached to the cross-head is a strap or belt, $z$, which communicates with any suitable elevating mechanism. $z'$ is a device that shifts a clutch so as to permit the descent of the cross-head and its attached plunger Y. Projecting laterally from plunger Y, and near the upper termination of its inclined edge $Y^2$, is a pin, 1, which, when said plunger descends, comes in contact with a system of springs, 2, thereby shifting a rod and causing the plunger to ascend.

As the devices $z'$ and 1 and 2 constitute no part of the horseshoe-machine proper, further description of them is unnecessary in this specification, especially when it is known that any approved mechanism may be employed instead of said devices.

Projecting rearwardly and horizontally from cross-head Z is a rigid bracket, 3, whose outer end has pivoted to it at $3'$ a lifting-latch, 4, whose heel $4'$ renders said latch perfectly unyielding when the cross-head ascends, while, at the same time, the latch is free to swing on its pivot when the plunger descends, as indicated in Diagram 23. This latch is ridge-shaped on its upper edge, and is adapted to alternately engage with the notches $5^1$ or $6^1$ of the curved tripping-bars 5 and 6, which latter are, respectively, slotted at $5^2$ and $6^2$, so as to slide on the guide-pins 8 and 9. These pins project horizontally from the front of lugs $8'$ and $9'$ of frame 10, the latter being attached to the main frame of the machine by braces $A^3$. The projecting lugs $8'$ and $9'$ of the frame 10 are more clearly shown in Fig. 1.

Pivoted to this frame 10 at 11 is a swinging or pendulous lever, 12, that projects down about as far as the creasing and punching boxes, while the upper end of said lever reaches nearly to the top of its supporting-frame. This swinging lever is forked at 13 and 14, and said forks are, respectively, provided with stops $13'$ and $14'$ that enter the slots $5^2$ and $6^2$ of the tripping-bars 5 and 6. Attached to the braces $A^3$ of frame 10 is a bent spring-retainer, 15, which is adapted to act alternately upon the pins $16'$ of the aforesaid tripping-bars 5 and 6. The details of this swinging lever and its accessories are clearly shown in Figs. 17 and 18. Attached to the lower end of lever 12 is a wire rope or chain, 19, which, after being passed around sheaves 17 and 18, is then secured to the front of creasing-box Q. Projecting from this box is a straight bar, 21, armed with two stops, 22 and 23, which stops limit the movement of boxes Q and Q' to the right and left. These stops may either come in contact with sheave 18, as represented in Fig. 1, or they may be arrested by a vertical bar, 24, as seen in Fig. 2. In the former illustration these sheaves are shown journaled upon short columns, while in the latter illustration they are represented as mounted upon an angular frame secured to the main frame $A^2$ and the upright 24.

The lower end of swinging lever 12 has attached to it another rope or chain, 25, that communicates with a vibrating arm, 26, pivoted near the delivery end of bed-plate $B^1$. From the front end of this arm 26 a rod, 27, extends to punching-box Q'.

Adapted to ride upon bracket 3 is a lifting-bar, 28, having guides 29 and 30 and hooked rods 31 and $31'$, to the lower ends of which latter are attached the ropes G G' that retract carriage F, and thereby open the bending-jaws D D'.

The space $a$ between the two piers A and A contains a stout stirrup, 32, whose ends rest upon powerful springs 33 of any suitable size and shape. (See Figs. 3 and 4.) 34 and 35 are guides for confining said stirrup to a vertical path. This stirrup may be omitted, and any suitable buffer or cushion may take its place. The object of this device is to arrest the descent of plunger Y, and also to initiate its return or ascending stroke, thus relieving the springs $w'$ and $x$ of any continuous strain. In addition to this advantage, the slight return movement imparted to plunger Y by said springs 33 instantly retracts the dies $r$ and punches $v$, and thereby prevents said devices $r$ and $v$ being injured by remaining too long in contact with the heated blank.

To illustrate the operation of my machine, I will suppose that the plunger Y has first been elevated so as to occupy a position vertically above the slot $q$ of creasing-box Q, which box in this normal position of the apparatus is shifted toward the feeding end of bed-plate $B^1$, so as to bring said slot $q$ exactly in line with the transverse slots $b$ $b^1$ of the two bed-plates. In this elevated position of plunger Y the lifting-bar 28 is raised by the bracket 3, and motion is imparted from said bar to the chains G G' through the instrumentality of hooked rods 31 and $31'$, thereby retracting stumps E $E^1$, as far as their studs $e$ $e'$ will travel in the slots M and M'. As the stumps E $E^1$ are connected to the bending-jaws D D', and also to the carriage F, it is apparent that these members of the machine must have a corresponding movement imparted to them, and, consequently, said carriage F is retracted and the jaws D D' distended, as seen in Figs. 5 and 6. In this condition of the jaws the gage K occupies the position shown in Fig. 5, and is maintained in such position by the pin $h^2$ entering the notch $k^2$ of link $k$. The heated blank, of the proper length for a single shoe, is then fed in by hand in the direction indicated by arrow in Fig. 5, and as soon as the advancing end of said blank comes in contact with the now immovable gage K, the further progress of the bar is arrested. The heated blank is now ready to be operated on by the bending-jaws D D', which latter are brought into action by the descent of the plunger Y, whose retaining device $z$ liberates any suitable appliance, such as a clutch-coupling, or otherwise.

As soon as the lower end of plunger Y passes through slot $b^1$, the inclined edge or wedge $Y^2$ comes in contact with the guide-roller F' of carriage F, and instantly drives the latter to the front end of extension $B^4$, as seen in Fig. 8. This advancement of said carriage draws the stumps E $E^1$ to the front ends of slots M M', and thereby swings the jaws D D¹, and their immediate accessories, around to the position seen in Fig. 7. This irresistible closure of the jaws bends the blank around the die $b^2$ in the most perfect manner, and in a moment's time, the flanged rollers I I' $i$ serving to hold said blank firmly down upon the bed-plate B¹ while this bending operation is being accomplished. As soon as the plunger has dropped far enough to insure this perfect bending of the blank, the further descent of said plunger brings its flange $y$ in contact with the caps U of creasers $r$, and the latter are at once driven into the heated bar so as to fuller the shoe. The plunger is prevented descending too far by the stirrup 32, which latter is so adjusted as to cause its two springs 33 to elevate said plunger a slight distance the moment the creasers have done their work, at which time the engagement of pin 1 with mechanism 2 operates any suitable appliances for shifting the clutch-coupling so as to elevate the plunger to the top of guides $a'$ $a''$. When the plunger has been elevated far enough, the latch 4 of bracket 3 engages with notch $6^1$ of tripping-bar 6, and thereby swings the pendulous lever 12 to the left, as represented in Fig. 18, which movement of said lever shifts the connected boxes Q Q' to the right or feeding end of the machine. The movement of said boxes is limited by the stop 22, which arrests the boxes in such a position as will insure the slot $q^1$ of punching-box Q' being brought exactly in line with slots $b$ $b^1$ of the bed-plates. The slots $b$ $b^1$ and $q^1$ are now directly in line with the plunger, which plunger is instantly dropped a second time. During this descent the wedge $Y^2$ acts against the carriage, and operates the jaws in the same manner as it did when the first blow was struck, but the second closure of said jaws has no effect whatever on the bent blank. The only object of this second blow is to punch the nail-holes in the creased portion of the shoe, which is effected by the flange $y$ striking the caps U of the punches $v$. This underpunching, like the creasing operation, is accomplished in a moment, and the instant it is done the springs 33, and elevating devices 1 and 2, again act as previously described. During the second ascent of the plunger, the latch 4 engages with notch $5^1$ of tripping-bar 5, thereby swinging lever 12 to the right, as seen in Fig. 17, which action of said lever imparts a retrograde motion to the connected boxes Q and Q¹. This retraction of said boxes is limited by the stop 23 coming in contact with sheave 15, or with bar 24, so as to bring the slot $q$ of creasing-box Q directly under the plunger Y, in which position of the apparatus the machine is ready to receive the second blank, which is fed in by hand as soon as the finished shoe is removed.

Owing to the powerful compression of the blank J around the die $b^2$ considerable force is necessary to disengage the finished shoe therefrom; but this act is easily accomplished by the attendant depressing lever $n'$ with his foot, thus elevating push-pin N¹ and freeing the shoe from the die, as seen in Diagram 22. The attendant, who operates the treadle $n'$, then grasps the shoe, and removes it from the machine with a pair of tongs or other convenient tools. At every ascent of the plunger the jaws D D' are distended, and, consequently, the blank is not subjected to the pressure of rollers I I', as they assume the position shown in Fig. 5 every time the jaws are opened. This non-effective position of the pressure-rollers is compensated for by the provision of the claw O', which advances and clamps the blank J down on the bed-plate B¹ as soon as the plunger is slightly elevated. This clamping action is caused by the flange $y$ of the ascending plunger being brought in contact with lever P; but when the plunger descends, lever P swings on its pivot $p'$, so as to retract said claw about as soon as the rollers I I' resume their pressure. The retracted or non-effective position of said claw is shown in Fig. 3, while the advanced or clamping condition of the same is seen in Fig. 10. The spring 15 of frame 10 prevents any descent of either of the tripping-bars 5 or 6 at the wrong moment by bearing against the appropriate pin 16', as seen in Figs. 17 and 18; but in case both of said bars should drop at once while plunger Y is descending, the latch 4 will swing on its pivot 3', and thereby prevent any injury either of said bars 5 and 6, or of the bracket 3. (See Diagram 23.)

Every time the creasers $r$ and punches $v$ are elevated a slight discharge of oil takes place down the passages $s$ and $t$, thereby automatically lubricating said devices $r$ and $v$.

As the leading feature of my invention consists in forcibly closing the bending-jaws by means of a heavy wedge-shaped plunger, I reserve the right to employ any suitable mechanism for transmitting the power from the plunger to the jaws. I also reserve the right to substitute any appropriate buffer, cushion, or spring for the stirrup that receives the impact of the descending plunger.

In this specification the words "fixed die" are used to indicate the relation of member $b^2$ with reference to the jaws that close around it; but it is to be distinctly understood that said die is capable of removal from the bed-plate B¹ whenever desired.

The upper ends of lifting-rods 31 and 31' may be supported upon a spring or on a system of springs secured to the bar 28, and similar springs may be applied where the chains 19 and 25 connect with lever 12. The object of these devices is to prevent any sudden jar or concussion of the jaws D D' or boxes Q Q' when the machine is driven at a high speed.

I claim as my invention—

1. A horseshoe-machine whose bending-jaws are closed around a fixed die by the descent of a vertically-reciprocating wedge-shaped plunger, which plunger passes through the longitudinal slot of the die, substantially as herein described and set forth.

2. A horseshoe-machine, consisting, essentially, of a vertically-reciprocating wedge-shaped plunger for closing the bending-jaws around the fixed die, and two horizontally-reciprocating boxes, carrying the creasing and punching devices, into which boxes said plunger alternately descends, substantially as herein described and set forth.

3. The combination of vertically-reciprocating wedge-plunger $Y Y^1 Y^2$, slotted bed-plate $B^1 b'$ M M', fixed die $b^2$, pivot C, bending-jaws D D', stumps E $e$ $E^1$ $e^1$, arms $E^2$ $e^2$ $E^3$ $e^3$; and carriage F $f$ $f^1$ F', substantially as herein described and set forth.

4. In combination with stumps E $e$ $E^1$ $e^1$, carriage F F' $f f^1$, and connections $E^2$ $E^3$ for closing the bending-jaws D D', in the manner described, the flexible mediums G G', sheaves $g$ $g'$, rods 31 and 31', and lifting-bar 28, which latter is elevated at the proper time by the ascending plunger, so as to open said bending-jaws, substantially as herein set forth.

5. In combination with the hinged and notched bending-jaws C D $d$ D' $d'$ and fixed die $b^2$, the pivoted levers H $h$ $H^1$ $h^1$, whose inner ends carry flanged rollers I I' $i$, that exert only a downward pressure on the blank, substantially as herein described and set forth.

6. In combination with the pivoted bending-jaws C D $d$ D' $d'$, fixed die $b^2$, and levers H $h$ $H^1$ $h^1$, the stop or gage K, link $k$ $k^1$ $k^2$, pin $h^2$, slotted shackle L $l$, and guide-screw $l'$, arranged and adapted to operate with reference to each other, substantially as herein described and set forth.

7. The claw O' $o$ $o'$, applied to the head of pivot C, and adapted to be operated by lever P $p$ $p'$, so as to advance and clamp the blank, and then to be retracted and be released from the same, substantially as herein described and set forth.

8. The caps U and washers $u$, applied to the upper ends of creasers $r$ and punches $v$, substantially as herein described and set forth.

9. The fillings S, applied behind the creasers $r$ and punches $v$, and secured in position by the retaining devices $r^1$ or W $w'$, substantially as herein set forth.

10. The ducts $t$, channels $s$, and reservoir T, arranged with reference to the creasers and punches of a horseshoe-machine, so as to effect an intermittent discharge of oil, substantially as herein described and set forth.

11. The combination of shouldered creaser-holder R $r^2$ and two or more cylindrical stems, $R^1$ $R^2$, that pass through circular apertures in the creasing-box Q, substantially as herein described and set forth.

12. In combination with the punches $v$, heads V, and stems V', applied to the punching-box Q', as described, the outwardly-projecting pins U' resting upon the yoke X, which latter is supported upon a set of spiral springs, $x$, substantially as described.

13. The swinging lever 12 13 14, pivoted to frame 10 at 11, and adapted to vibrate either to the right or left, so as to shift the creasing and punching boxes, by the contact of latch 4 with the notches $5^1$ or $6^1$ of the slotted tripping-bars 5 $5^2$ or 6 $6^2$, substantially as herein described and set forth.

14. In combination with the swinging lever 12, the supporting-frame 10, and the two slotted tripping-bars 5 and 6, the projecting pins $16^1$ and spring-retainer 15, substantially as herein described and set forth.

15. In combination with swinging lever 12, operated substantially as described, the chains 19 and 25, sheaves 17 and 18, arm 26, and rod 27, for reciprocating the connected boxes Q and Q' longitudinally of the bed-plate $B^1$, substantially as described.

16. The rigid bar 21, applied either to creasing-box Q or to the punching-box Q', and furnished with stops 22 and 23 for limiting the movements of said connected boxes, substantially as herein described.

17. In combination with the wedge-shaped plunger Y, having a vertical edge, $Y^1$, and an inclined edge, $Y^2$, the grooves $y^1$ $y^2$ and flanged rollers F' $f^2$ N $n$, the former roller being journaled in the carriage F $f f^1$, while the latter roller is pivoted in a fixed bearing between the bed-plates B $B^1$ of a horseshoe-machine, substantially as herein described and set forth.

18. The provision, in a horseshoe-machine, of an elastically-supported stirrup, 32, which receives the impact of the descending plunger and initiates the return stroke of the same, substantially as herein described.

19. The combination of stirrup 32, supporting-springs 33, and vertical guides 34 and 35, substantially as herein described and set forth.

20. The cylinders $H^2$ $H^3$, for maintaining the rollers I I' in contact with the blank, and at the same time allowing their levers H $H^1$ to turn on the pivots $h$ $h^1$, substantially as herein described and set forth.

In testimony of which invention I hereunto set my hand.

SERAPHIN ESPACH.

Witnesses:
JAMES H. LAYMAN,
S. F. STURDEVANT.